United States Patent [19]

Burkarth

[11] Patent Number: 4,907,142
[45] Date of Patent: Mar. 6, 1990

[54] LIGHTING FIXTURE WITH DIFFUSER FOR LIGHT AND AIR

[75] Inventor: Jack Burkarth, Dallas, Tex.

[73] Assignee: Gulton Industries, Inc., Plano, Tex.

[21] Appl. No.: 129,258

[22] Filed: Dec. 7, 1987

[51] Int. Cl.$^4$ ............................ F21S 3/02; B60Q 1/00; F21V 29/00

[52] U.S. Cl. ....................................... 362/224; 362/74; 362/282; 362/260; 362/291; 362/294

[58] Field of Search .................... 362/74, 96, 223, 224, 362/287, 427, 130, 282, 260, 290, 291, 294, 373

[56] References Cited

U.S. PATENT DOCUMENTS

| | | | |
|---|---|---|---|
| 2,238,847 | 4/1941 | Dreyfuss | 362/74 |
| 2,284,534 | 5/1942 | Orth | 362/224 |
| 2,587,807 | 3/1952 | Arenberg et al. | 362/74 |
| 3,152,277 | 10/1964 | Cutler et al. | 362/260 |
| 3,210,875 | 10/1965 | Schwenkler | 362/74 X |
| 3,211,904 | 10/1965 | Schwenkler | 362/224 |
| 3,348,465 | 10/1967 | Kruger | 362/96 X |
| 4,157,584 | 6/1979 | Bhatt | 362/74 |
| 4,625,267 | 11/1986 | Mikaloni | 362/224 X |

Primary Examiner—Stephen F. Husar
Assistant Examiner—Peggy Neils
Attorney, Agent, or Firm—Darby & Darby

[57] ABSTRACT

A fixture for a fluorescent lamp includes a diffuser panel. The diffuser panel has a frame and longitudinal elements supported by the frame and spaced apart from one another. At least some of the elements are constructed of a material to allow diffusion of impinging light. Preferred materials are translucent or transparent, such as glass or plastic. The diffuser panel also functions as an air diffuser. Provision of a nozzle in the base of the fixture allows air to flow through the panel by a sucking effect created by high velocity forced air flowing through the nozzle. This results in fixture cleaning and temperature equalization. The fixture is particularly adapted to be mounted in a moving vehicle. For this purpose, the panel is designed to be tamper-resistant and to provide easy maintenance. The diffuser panel, when a latch is opened, may be lowered by rotation to provide access to the lamp and ballast. When the fixture is installed in a public vehicle, a handrail is provided which forms part of the panel lowering mechanism.

11 Claims, 4 Drawing Sheets

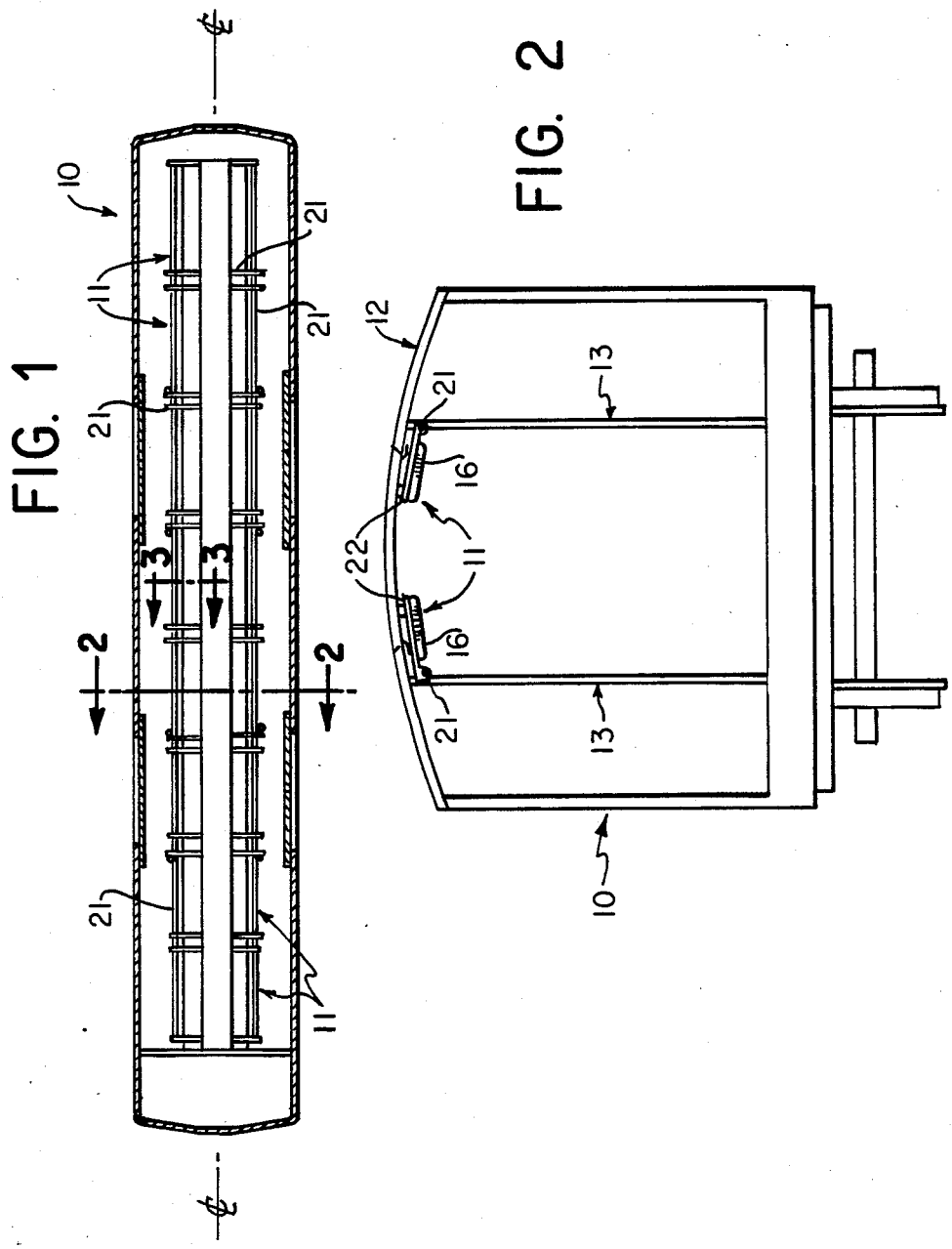

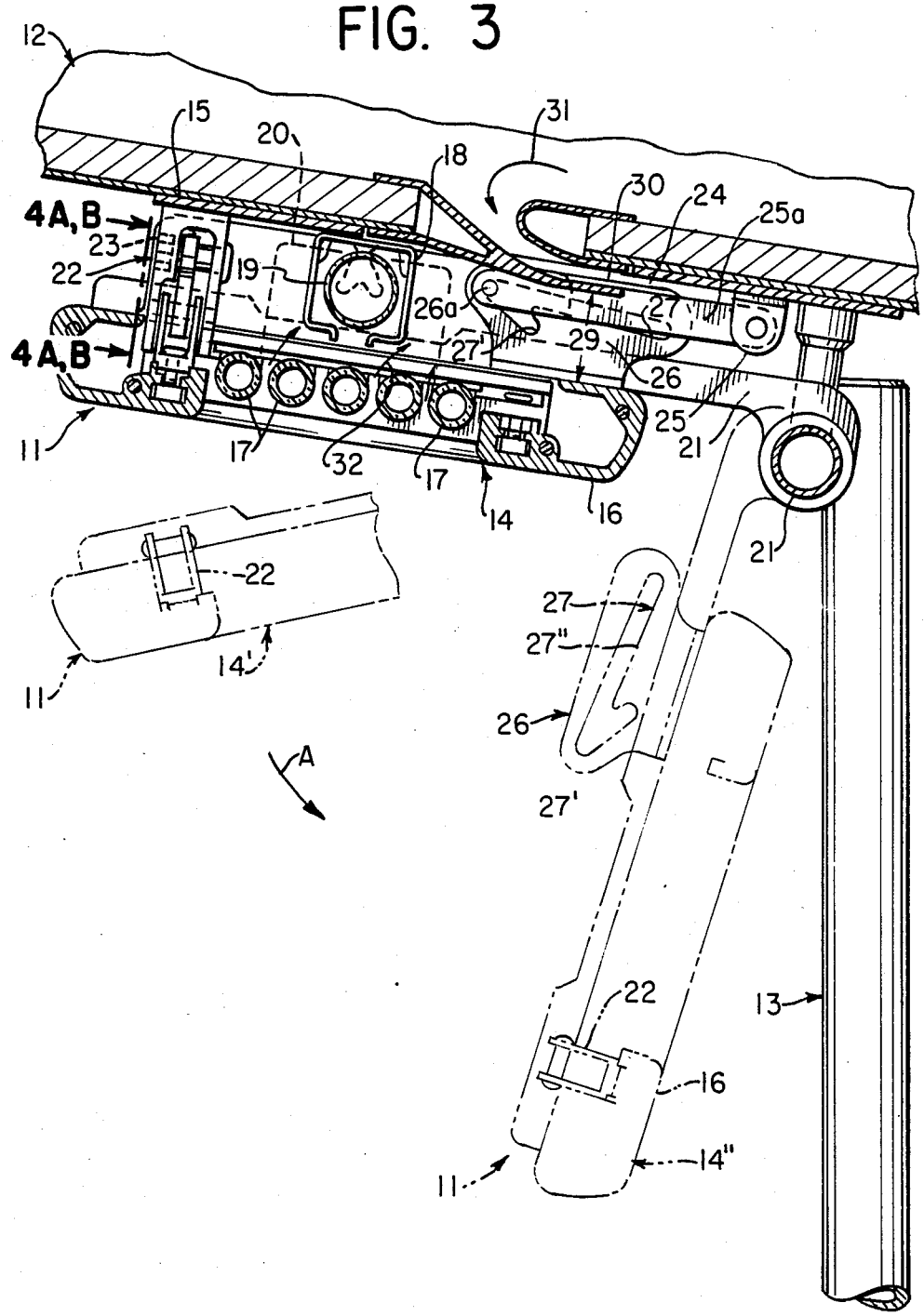

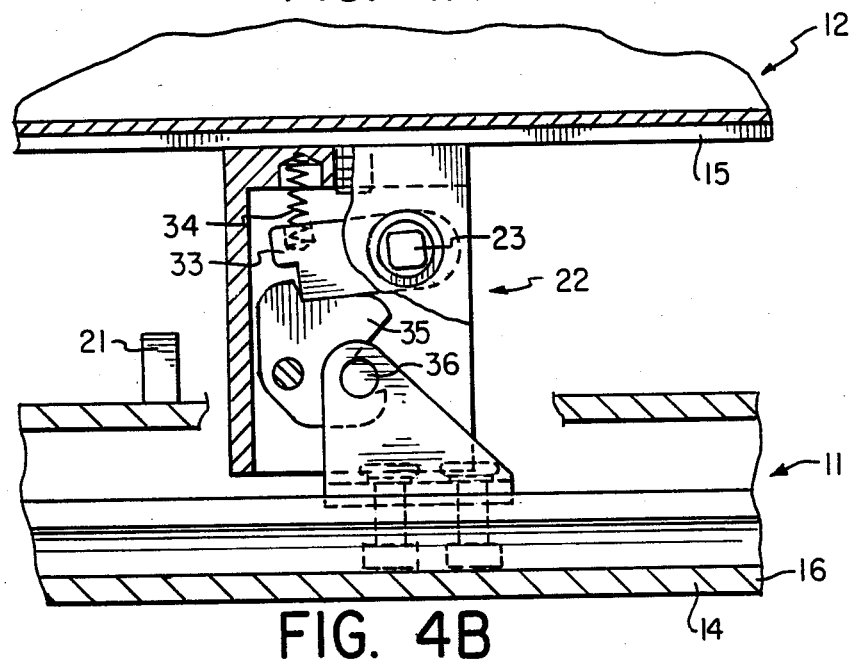
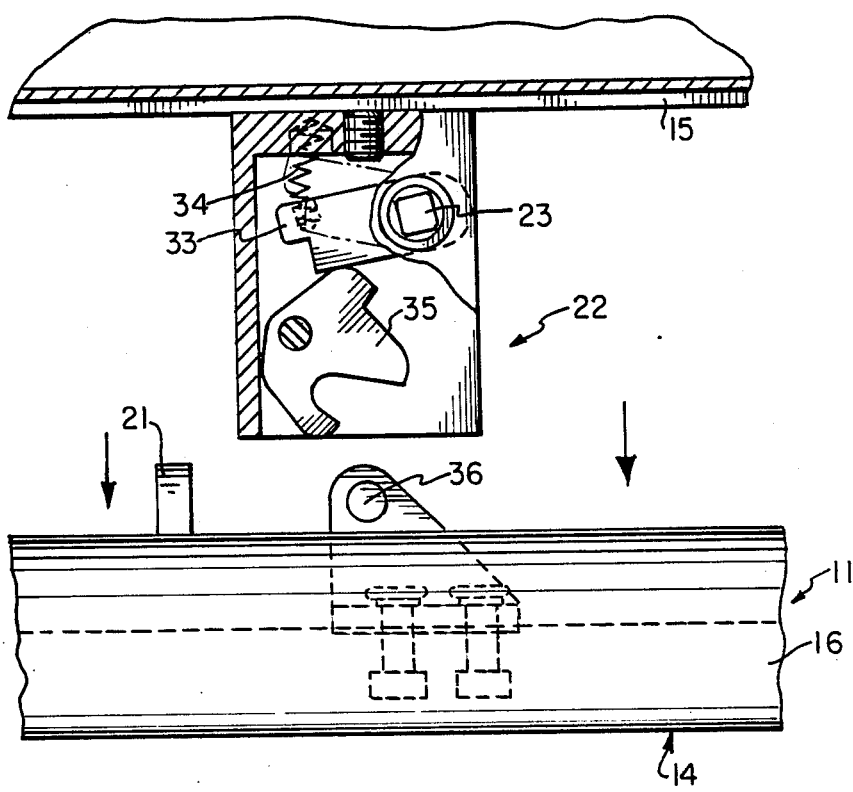

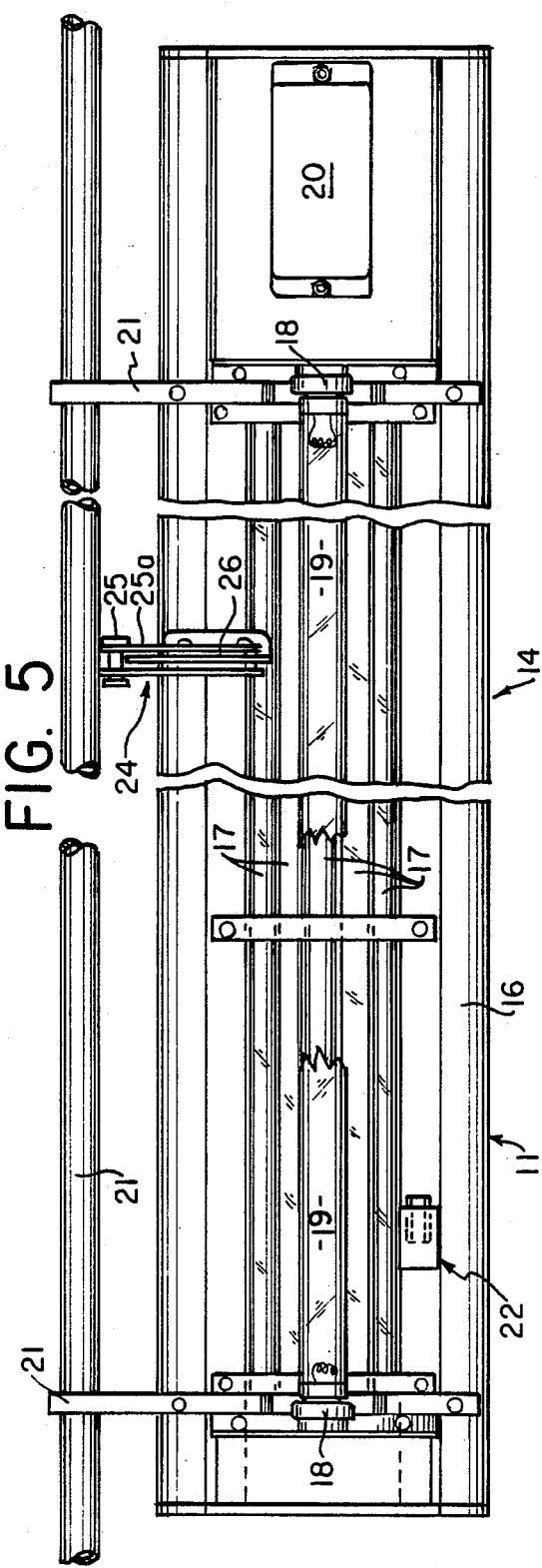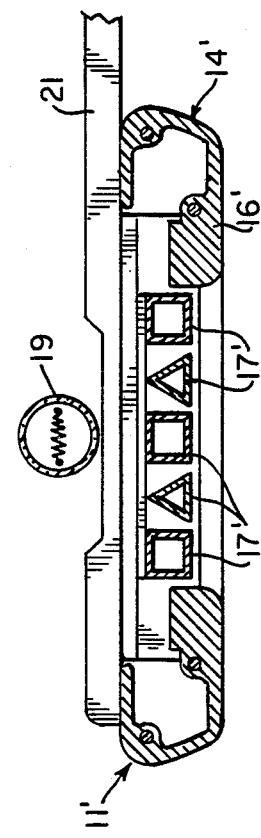

LIGHTING FIXTURE WITH DIFFUSER FOR LIGHT AND AIR

BACKGROUND OF THE INVENTION

A. Field of the Invention

The present invention relates to fluorescent fixtures having light diffusers and, more particularly, such fixtures for use in moving vehicles which also include air diffusers.

B. Description of the Related Art

Many existing public vehicles have antiquated fluorescent fixtures. These fixtures were installed many years ago when the vehicles were new and often little attention was paid at that time to providing fixtures which had adequate light diffusers. Also, for such fixtures, a requirement exists for providing air diffusion and circulation around the fluorescent lamp for purposes of cooling and for self-cleaning. With additional requirements for allowing easy maintenance for these fixtures and for making the fixtures vandal-resistant, such fixtures and diffusers are difficult to design since significant tradeoffs are necessary in order to meet all desired conditions.

One particular application for such improved design is the needed replacement of the existing fluorescent fixtures in the cars of the London subway system. Such cars have open fluorescent fixtures disposed in two parallel paths along the car ceiling. The fixtures have no diffusers of any kind and the lamps in the fixtures may be readily broken either accidentally or by vandals. Further, the glare of the lamps is unpleasant and the lamps provide levels of light which are considered excessive for normal reading. The lighting effect is not aesthetic to the viewer, in general. The ballasts for the lamps are also generally difficult to reach for purposes of servicing.

OBJECTS OF THE INVENTION

It is an object of the invention, therefore, to provide a fluorescent light fixture having an improved light diffuser.

It is also an object of the invention to provide an improved light diffuser for a fluorescent light fixture which also functions as an air diffuser.

It is a further object of the invention to provide a combined light diffuser and air diffuser for a fluorescent light fixture which is simple to service and maintain.

It is still a further object of the invention to provide a combined light diffuser and air diffuser for a fluorescent light fixture which is tamper- and vandal-resistant.

It is another object of the invention to provide a combined light diffuser and air diffuser for a fluorescent light fixture which is self-cleaning.

It is yet another object of the invention to provide a fluorescent light fixture having a combined light diffuser and air diffuser adapted for use in a public vehicle which also incorporates a handrail as an integral part of the fixture.

It is still another object of the present invention to provide a combined light diffuser and air diffuser for a fluorescent light fixture which is adapted to be constructed by extrusion techniques.

It is a further object of the invention to provide a fluorescent light fixture having a combined light diffuser and air diffuser for use in vehicle compartments which also provides improved mixing and temperature equalization of the compartment air.

SUMMARY OF THE INVENTION

In accordance with the present invention, these and other objects are met by a fixture for a fluorescent lamp having a light diffuser comprises a base and a light diffusing panel mounted to the base and having mounting and electrical connection means for receiving a fluorescent lamp. The lamp mounting and connection means are located on a surface of the panel facing the base. The panel has openings therein for allowing air to circulate through the panel to allow cooling of the fixture and cleaning of such lamp and panel. The fixture includes hinge means supporting a first side of the panel and being affixed to the base for allowing the panel to be rotated about the hinge means. Also included are openable latch means having a portion affixed to the base and a portion affixed to a second side of the panel and supporting the second side. The latch means, when opened, permit lowering of the panel by rotation about the hinge means for allowing cleaning and maintenance of the fixture.

Also, in accordance with the present invention, a fixture for a fluorescent lamp having a diffuser for light and air comprises a base, a light and air diffusing panel, and nozzle means incorporated in the base. The light and air diffusing panel is mounted to the base and has mounting and electrical connection means for receiving a fluorescent lamp. The lamp mounting and connection means are located on a surface of the panel facing the base. The panel has openings therein for allowing air to circulate through the panel to allow cooling of the fixture and cleaning of the panel. The nozzle means has an entrance on the side of the base facing away from the panel and an exit on the side of the base facing toward the panel. The exit directs emerging air in a direction substantially parallel to the base. The nozzle means allows air to be pulled through the panel by suction action caused by an air stream moving through the nozzle means.

Further, in accordance with the invention, a diffuser panel for a fluorescent lamp fixture comprises a frame and longitudinal elements supported by the frame and spaced apart from one another, at least some of the elements being constructed of a material to allow diffusion of impinging light.

For a better understanding of the present invention, reference is made to the following description and accompanying drawings, while the scope of the present invention will be pointed out in the appended claims.

BRIEF DESCRIPTION OF THE DRAWINGS

In the drawings:

FIG. 1 is a schematic plan view of a railway car fitted with fluorescent fixture assemblies in accordance with the invention;

FIG. 2 is a cross-sectional view along 2—2 of FIG. 1 particularly illustrating the arrangement of the fixture assemblies within the car;

FIG. 3 is an enlarged cross-sectional view along 3—3 of FIG. 1 illustrating the fluorescent fixture of the present invention in detail, including location of the diffuser panel when opened for servicing;

FIG. 4A and FIG. 4B are elevational views, partly broken away, taken along 4A,B—4A,B of FIG. 3, of the panel latch in closed and open position, respectively;

FIG. 5 is an enlarged bottom view of the diffuser panel; and

FIG. 6 is a cross-sectional view of another embodiment illustrating longitudinal diffusing members having differing cross-sections.

DESCRIPTION OF THE PREFERRED EMBODIMENTS

Referring initially to FIGS. 1 and 2, a subway car 10 is depicted in which fluorescent lamp fixtures 11 in accordance with the invention have been installed. The installation of the fixtures is made to the ceiling 12 of the car adjacent to vertical supporting pole 13. The fixtures 11 are designed to have identical repeated sections, each section capable of accommodating a 48 inch fluorescent lamp (T12 size). A portion of each fixture section includes a handrail 21 for being grasped by passengers. The side-to-side juxtaposition of the repeated fixture sections creates, in effect, a continuous handrail on either side of the car.

Referring now to FIG. 3, the details of the construction of a fluorescent fixture section 11 are illustrated. Each fixture section includes a fixture base 15 which is affixed to the ceiling 12 of the subway car by means not shown. To the base 15 is attached a diffuser panel 14. The panel 14 is mounted so as to be substantially parallel to the base 15. The diffuser panel 14 includes a frame 16 which supports a plurality of longitudinal elements 17.

The longitudinal elements 17 are spaced apart from one another and, in a preferred arrangement, are substantially parallel to one another. They are preferably constructed of transparent or translucent material to refract, reflect and diffuse impinging light from a fluorescent lamp mounted above the panel. The preferred arrangement of FIG. 3 illustrates tubular, hollow, glass elements 17. Tempered glass is preferred for this application.

Depending on the application, longitudinal elements having differing cross-sections may be desired. FIG. 6 illustrates an embodiment of a diffuser panel 11' showing elements 17' having triangular and rectangular cross-sections in a single panel. Lamp 19 is shown above the longitudinal elements 17' in this view.

The materials possible for use in such panel may also be selected in accordance with the nature of light diffusion desired, as well as such other factors as cost, ease of manufacture and ability to withstand breakage. Transparent or translucent plastic material is within the scope of the invention, particularly clear acrylic plastic sold under the trade name "LUCITE" and a clear polycarbonate plastic sold under the trade name "LEXAN". Purely reflective or absorptive materials are also possible, such as polished or anodized aluminum rods made by extrusion.

The shape and spacing of the longitudinal elements are designed to permit dust and dirt to fall through the panel when no forced air is provided to the panel. When forced air is provided to the panel, as in a manner to be discussed below, the panel and longitudinal elements also function as an air diffuser.

The diffuser panel 14 is attached to the base 15 on either side of the frame 16. On one side, a hinged support 21 is provided. On the other side, the panel is supported by at least one panel latch 22. In a preferred arrangement, two panel latches are required for each section. The latch 22 has a portion affixed to the base and a portion affixed to the panel frame 16. To avoid unauthorized opening of the panel latch, a pair of panel latch releases 23 are provided for each fixture section which have a keying arrangement. The keying arrangement requires that a special tool be used to open the fixture.

The hinged support 21 serves a dual function. The support permits the panel to be lowered, when the latches 22 are opened, by rotation about the axis of the hinge. Along the axis of the hinge, in this preferred embodiment, a handrail is arranged for passengers to grasp.

A rotation-limiting mechanism 24 is provided to prevent the panel, when unlatched, from immediately dropping to a fully rotated position. The mechanism includes a hinge support 25 affixed to the base which cooperates with a rod 25a. Affixed to the end of the rod 25a is a camming element 26. A camming groove 27 is provided in a camming guide affixed to one side of the panel frame 16. The shape of the camming groove is such that, when the panel is opened, the cam 26a will travel only a short distance to 27'. In order to obtain full descent of the panel, it is necessary to raise the panel slightly to allow the cam 26 to travel to 27" in the camming groove 27.

Fluorescent lamp mounting members 18 are provided for allowing the lamp 19 to be installed and electrically connected in each fixture section. These members 18 are preferably mounted on opposite end portions of the panel frame 16 so that the lamp is centrally located above the longitudinal members 17 and substantially parallel to them.

A fluorescent ballast 20 is also mounted in the fixture section, preferably on one end of the panel frame. While the ballast 20 and lamp 19 could also be mounted to the base 15, there is a significant advantage in ease of maintenance to have these elements more readily accessible to a service person upon lowering of the panel. This lowering operation is shown in phantom lines in FIG. 3. The panel 14 is first rotated to a position 14' in the direction A and, finally, to a position 14". In this position, the lamp and ballast are readily accessible for servicing.

A top view of the panel and fixture shown in FIG. 5 indicates the relative arrangement of the lamp 19 and ballast 20 with respect to the frame 16. Ballast 20 is mounted on an end portion of frame 16. Lamping mounting members 18 are mounted on opposite end portions of frame 16 to allow the lamp 19 to extend therebetween. Other elements bear like numerals to those elements shown in FIG. 3.

A principal feature of the fluorescent fixture 11 is the provision of nozzle or nozzles 28. Nozzle 28 is installed in base 15 so that the entrance of the nozzle is above the base while the exit 30 of the nozzle is below the base. The nozzle entrance has a larger cross-sectional area than the exit; the cross-sectional area gradually decreases from entrance to exit.

Provision of a high velocity stream of air 31 in the direction of arrow 31 will cause an area of negative pressure 29 below the nozzle exit 30. This, in turn, will cause by suction air from below the fixture to flow through the fixture, 32, to join the high velocity air at the nozzle exit. This effect is commonly known as a Venturi effect. The overall result will be to improve air circulation and equalize temperature distribution in the car. The high velocity air stream may be provided by warming or cooling air normally circulating in the car.

The nozzles 28 thus induct air from a room cavity to join the emitted air from a central forced-air heating or cooling equipment source. The combined mixed air is controlled in a preferred direction by orienting the nozzle appropriately. The induced vertical flow provides a cleansing of loose particles from the paths of light and maintains the full spacing between the longitudinal diffusing elements.

A preferred quick-release type panel latch 22 is shown in FIGS. 4A and 4B. In FIG. 4A the latch is closed. A hooked closing member 35 affixed to the base 15 engages a projection 36 forming part of a base member affixed to the panel frame 16. The closing member 35 is maintained in this condition by latch locking arm 33. Latch locking arm 33 includes a keying portion 23. When a keying tool turns the keying element 23, locking arm 33 is raised so as to release the closing member 35. The release is enhanced by spring 34. This opens the latch which enables the panel to be lowered, as is shown in FIG. 4B.

The diffuser panel frame 16 is preferably of aluminum construction. A preferred method for manufacturing the frame is by extrusion. Portions of the frame may be polished to a high metallic luster or anodized as desired.

The fluorescent fixture of the present invention includes a panel which functions as both light and air diffuser. Spaced-apart longitudinal elements within the panel permit air flow around them for purposes of cooling and self-cleaning. The longitudinal elements, preferably translucent or transparent, permit light to be directed through and around them.

A nozzle effect, forming part of the fixture, allows air to be inducted upward through the fixture to be combined with forced heating or cooling air for improved mixing and temperature equilibrium. This effect also cleans the fixture.

The mechanical arrangement of the fixture and panel permits easy maintenance (e.g., changing lamps) by simply lowering the panel. The arrangement also is tamper- and vandal-resistant. Handrails incorporated in the panel are particularly useful when the fixture is incorporated in a moving public vehicle.

While the foregoing description and drawings represent the preferred embodiments of the present invention, it will be obvious to those skilled in the art that various changes and modifications may be made therein without departing from the true spirit and scope of the present invention.

What is claimed is:

1. A fixture for a fluorescent lamp having a light diffuser comprising:
a base;
a light diffusing panel mounted to said base and having mounting and electrical connection means for receiving a fluorescent lamp, said lamp mounting and connecting means being located on a surface of said panel facing said base, said panel including light diffusing longitudinal rods which are substantially parallel to, and spaced apart from, one another so as to have openings therebetween for allowing air to circulate through said panel to allow cooling of the fixture and cleaning of the panel;
hinge means supporting a first side of said panel and being affixed to said base, for allowing said panel to be rotated about said hinge means; and
openable latch means having a portion affixed to said base and a portion affixed to a second side of said panel and supporting said second side, said latch means when opened permitting lowering of said panel by rotation about said hinge means for allowing cleaning and maintenance of said fixture.

2. The fixture of claim 1, wherein said rods are tubular.

3. The fixture of claim 2, wherein at least some of said rods are made of glass.

4. The fixture of claim 1, wherein the base of said fixture is adapted to be mounted on the ceiling of a passenger vehicle and wherein said hinge means has a longitudinal axis and includes a handrail disposed along said axis for being grasped by passengers, said latch means including intermittently spaced local latching mechanisms located along said handrail.

5. The fixture of claim 3, wherein said glass rods are made of tempered glass and are hollow.

6. The fixture of claim 1, wherein said latch means includes a keyed portion requiring a keyed tool to open said latch means.

7. The fixture of claim 1, wherein said latch means is of the quick release type.

8. The fixture of claim 1, including a release latch for preventing the panel from rotating more than a predetermined amount.

9. The fixture of claim 8, wherein said release latch includes means for allowing said panel to rotate selectively to one of two different positions.

10. The fixture of claim 8, including means for mounting a fluorescent ballast to said panel.

11. The fixture of claim 1, including nozzle means incorporated in said base for allowing air to be sucked through said diffusing panel as a result of air moving quickly through said nozzle means.

* * * * *